(12) United States Patent
Murphy

(10) Patent No.: US 8,276,853 B2
(45) Date of Patent: Oct. 2, 2012

(54) AIR HOSE SUPPORT CLIP TO PREVENT LATERAL LOADING

(75) Inventor: Wayne H. Murphy, Pottstown, PA (US)

(73) Assignee: Pennsy Corporation, West Chester, PA (US)

( * ) Notice: Subject to any disclaimer, the term of this patent is extended or adjusted under 35 U.S.C. 154(b) by 508 days.

(21) Appl. No.: 11/729,831

(22) Filed: Mar. 29, 2007

(65) Prior Publication Data

US 2007/0227999 A1   Oct. 4, 2007

Related U.S. Application Data

(60) Provisional application No. 60/787,114, filed on Mar. 29, 2006.

(51) Int. Cl.
 *F16L 3/00* (2006.01)
 *E21F 17/02* (2006.01)
(52) U.S. Cl. .............. 248/53; 248/60; 248/302; 24/301; 24/601.1; 24/908
(58) Field of Classification Search ............ 248/53, 248/302; 24/908, 601.3, 301, 601.1; 213/76
See application file for complete search history.

(56) References Cited

U.S. PATENT DOCUMENTS

| | | | | |
|---|---|---|---|---|
| 472,962 | A * | 4/1892 | Collins | 24/601.1 |
| 1,728,560 | A * | 9/1929 | Goshorn | 24/601.1 |
| 1,793,520 | A * | 2/1931 | Siptrott | 24/346 |
| 2,064,744 | A * | 12/1936 | Hall | 40/664 |
| 2,135,771 | A * | 11/1938 | Roof | 24/601.3 |
| 2,542,172 | A | 12/1947 | Wold | |
| 2,664,612 | A * | 1/1954 | Winkelman | 24/601.8 |
| 2,871,540 | A * | 2/1959 | Smith | 24/600.9 |
| 3,335,472 | A * | 8/1967 | Imai | 24/601.1 |
| 3,784,030 | A * | 1/1974 | Chierici | 213/76 |
| 4,696,120 | A * | 9/1987 | Schroeder | 43/44.83 |
| 4,986,500 | A | 1/1991 | Campbell | |
| 5,937,570 | A * | 8/1999 | Abdul-Raheem | 43/44.92 |
| 6,141,839 | A * | 11/2000 | Yong-Set | 24/601.8 |

OTHER PUBLICATIONS

EZ Adjust Strap, http://www.pennsy.com/OtherProducts/EZStrap/index.htm, Oct. 23, 2002, pp. 1-7.
Prevent Air Hose Separations with Pennsy Trainline Trolley, The Pennsy Review, Newsletter Trainline Trolley, http://www.pennsy.com/NewsLetters/Trolley_Loop.htm, Oct. 24, 2002.

* cited by examiner

*Primary Examiner* — Anita M King
(74) *Attorney, Agent, or Firm* — John F. A. Earley, III; Frank J. Bonini, Jr.; Harding, Earley, Follmer & Frailey, P.C.

(57) ABSTRACT

Apparatus for suspending a device such as the end of a depending air brake hose from a railcar. A flexible strap of a synthetic resin such as moldable polyurethane is suspended from the railcar body, for example, by attachment to an apertured fitting on the railcar coupler. Elongated resilient wire clips are provided to attach the free end of the air hose. The wire clips are generally configured with a latching end including interlocking end portions for connection to the strap through a selected attachment aperture, a pair of flexibly resilient, elongated manually compressible elongated arms extending away from the latching end portions and a return portion joining the arms. The clip is further provided with a retainer operative when the arms are interlocked for maintaining the attachment aperture fitting within the confines of the return portion and out of position in which loading of the clip is exerted laterally of the clip arms.

26 Claims, 4 Drawing Sheets

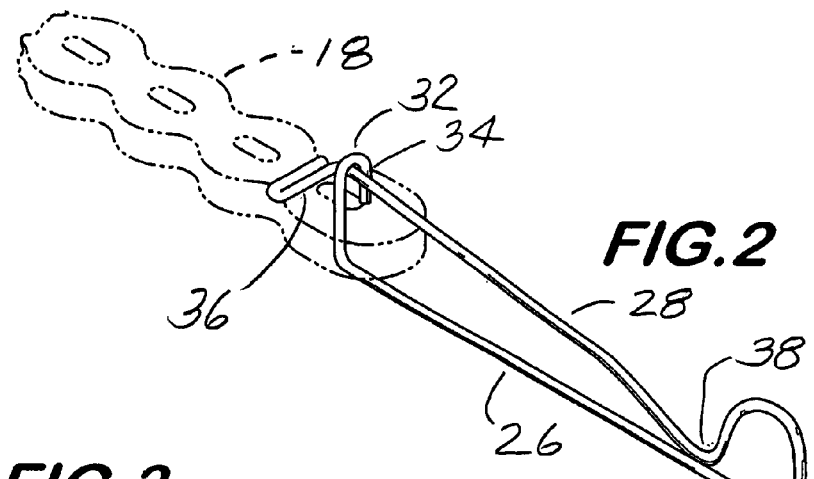
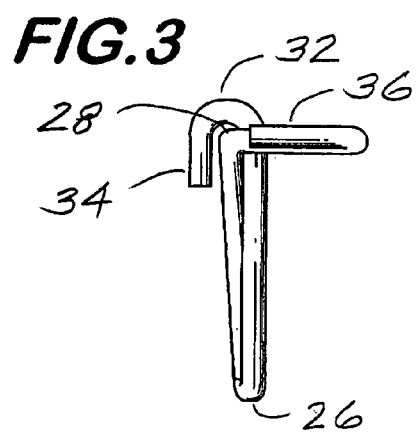
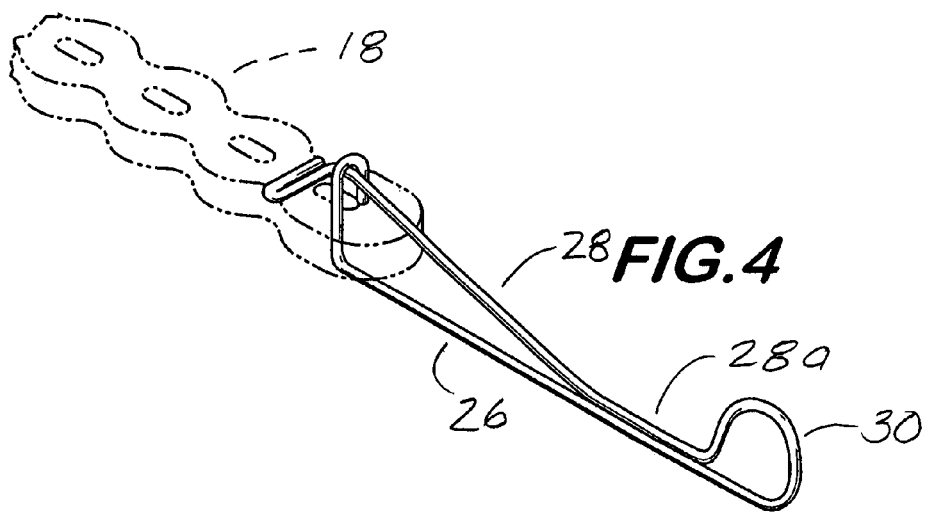

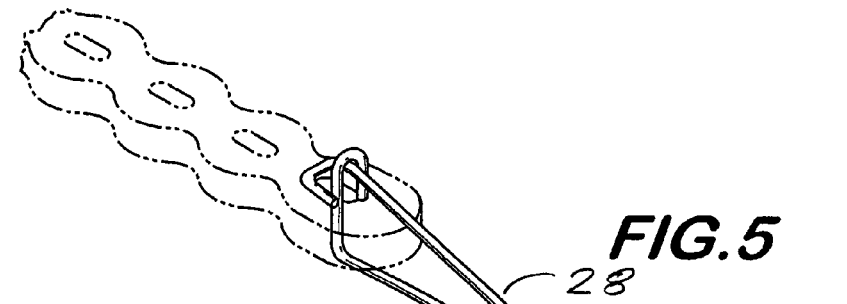
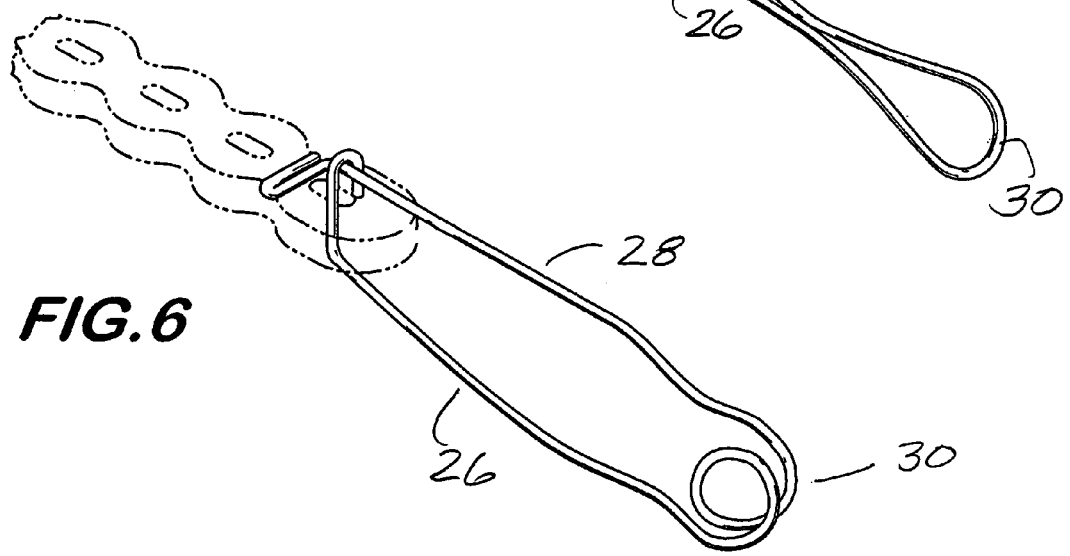
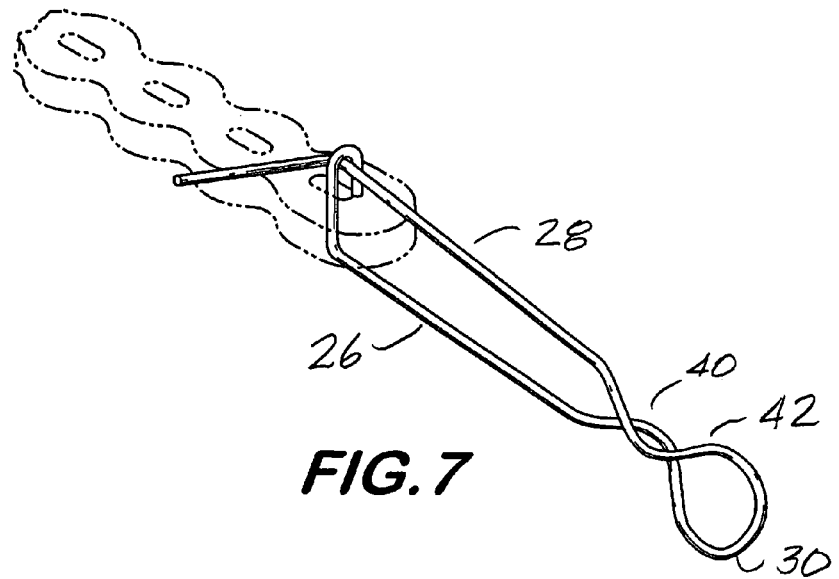

AIR HOSE SUPPORT CLIP TO PREVENT LATERAL LOADING

CROSS REFERENCE TO RELATED APPLICATION

This application is based on and claims priority to U.S. Provisional Application No. 60/787,114, filed Mar. 29, 2006.

FIELD OF THE INVENTION

This invention relates to air hose suspension systems for rail cars and the like and especially a simplified, reliable clip and readily adjustable strap assembly for maintaining a flexible device such as the end of a rail car hose at a desired height above the rail structure.

BACKGROUND OF THE INVENTION

Failure to maintain rail car hoses at a proper height above the rail structure is a significant cause of unintended air hose coupling separation leading to emergency braking and stopping of the train and sometimes even derailment. Obviously, emergency braking is a cause of time-consuming and costly train delays as a result of the need for a crew member to walk the length of the train looking for the cause. When an uncoupled air hose is discovered, the crew member must reconnect the coupling members or effect an emergency repair before returning to the engine.

To eliminate the problem, it is known to provide air hose straps interconnected between the coupler or other parts of the car and the end of the air hose. Known straps have a fastening system including wire clips which have a hooked end which fits through an aperture on a fixture on the air hose. The wire is then looped back through a selected aperture on the strap and then captured by the hooked end.

The looped portion of one of the prior art clips extends through an aperture in a bracket typically provided on the bottom of each rail car coupler. A second clip is provided which is preferably identical to the first. The looped portion of the second clip fits through an aperture integral with the glad hand fitting on the end of the air hose. If the straps have not been properly installed or should the strap material elongate over time, readjustment becomes necessary to avoid the risk that the air hose will strike a cross tie, a grade crossing, a switch or other track structure causing air hose separation.

While air hose support straps made of chain, steel cable or webbing can be used, the presently preferred approach is to use an elastomeric strap material capable of providing some give in operation. Polyurethane is a presently preferred strap material. Elongated spring clips as fastener members are provided for attachment of one of the ends of the strap to the railcar body and the opposite end to an apertured fitting at the end of the air hose.

Although these assemblies are effective in supporting the end of the air hose, a problem arises which leads to damage and ultimately to failure of the clips in service. This problem was investigated following field service reports of air hose support straps that had failed because of "bent or missing clips".

The investigation revealed that over 95% of clip damage occurred to the clip connecting the bottom of the support strap to the air hose glad hand fitting. From analysis of a number of clips produced by different manufacturers, it was observed that the damage was a result of the clip being strained on the long sides of the clip (lateral loading) instead of along the long axis of the clip (longitudinal loading). The clips are much stronger when the load is applied on the clip ends rather than on its long sides.

The invention is based on a recognition of the cause of this lateral loading and to the means provided for eliminating it. Lateral loading occurs when the railroad car coupler is in the buff position as occurs when it is not under load. In this condition, the air hose support is slack, which allows a clip of prior art design to slide along its length through the glad hand aperture. When the coupler returns to the neutral or draft position, the load is applied to the side of the clip where it is weakest rather than its ends, bending the clip into an oblong or ovoid shape. Eventually, this causes the clip's locking integrity to be lost. It was observed that this type of lateral loading accounts for the majority of clip damage failures.

SUMMARY AND OBJECTS OF THE INVENTION

The present invention provides a solution to the problem of air hose support clips being damaged through the action of the coupler system.

In a clip according to the invention, the end used for connection to the lower, glad hand end of the air hose includes a retainer to prevent the clip sliding through the glad hand connector aperture, thereby avoiding the risk of damage through lateral loading. The retainer preferably comprises bent portions of the clip arms which are relatively positioned to prevent movement of the clip through the aperture when the clip arms are latched. Optionally, the retainer may take form of one or more helical loops in which the attachment aperture is interfitted, or provision of a retainer attachment which attaches to the clip arms and retains the attachment aperture within the loop interconnecting the clip arms as further explained and illustrated in the following detailed description of preferred embodiments of the invention.

BRIEF DESCRIPTION OF THE DRAWINGS

FIG. 2 is a perspective view of a clip forming a preferred embodiment of the invention;

FIG. 3 is an end view of the clip of FIG. 2;

FIG. 4 is a perspective view of the modified form of the clip of FIGS. 2 and 3;

FIG. 5 is a perspective view similar to FIG. 4 illustrating another embodiment of the clip of the present invention;

FIG. 6 is a perspective view showing still another embodiment of the clip of the present invention;

FIG. 7 illustrates in perspective a further embodiment of the clip of the present invention;

DETAILED DESCRIPTION OF THE EMBODIMENTS

Figure 1:
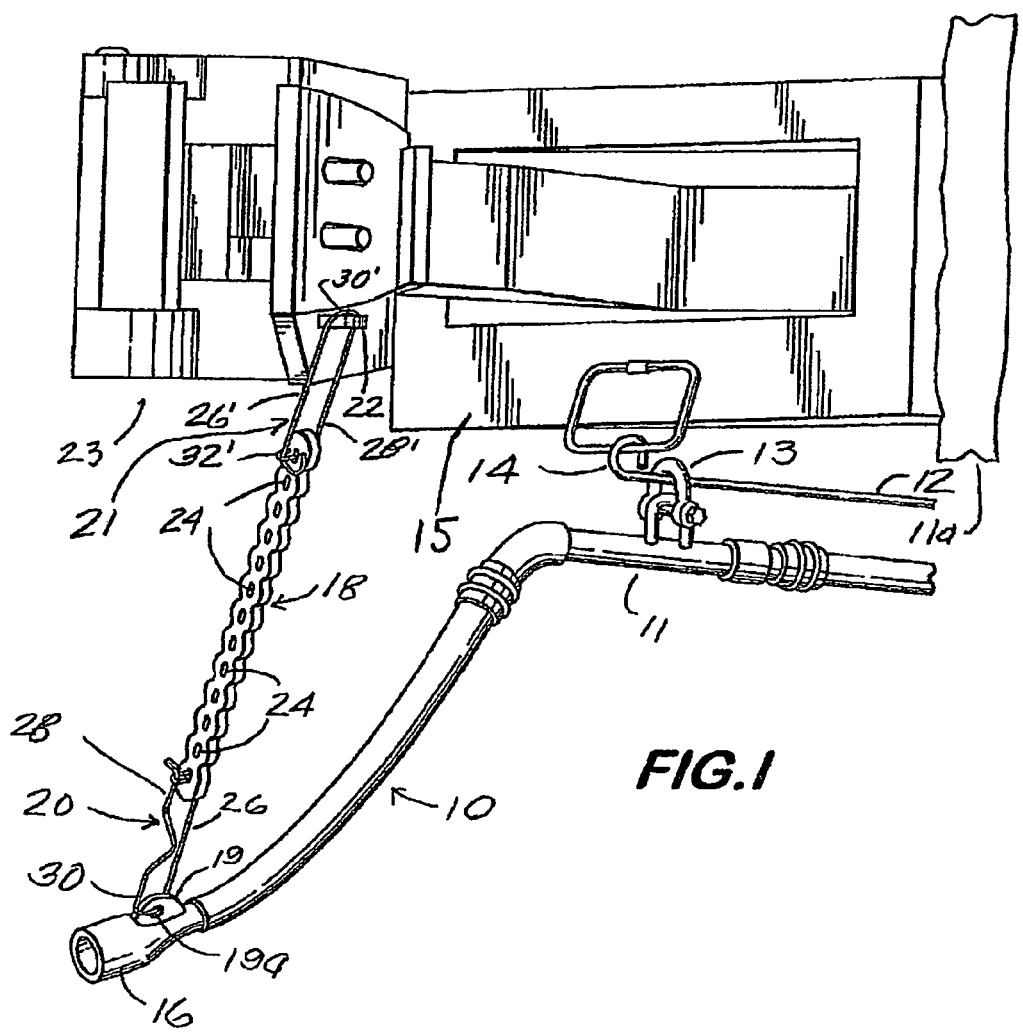
FIG. 1 is a fragmentary view, in perspective, of a railcar including a coupler and train line structure illustrating the use of a support strap assembly of the present invention.

As illustrated in FIG. 1, an air brake hose conventionally constructed of rubber or other flexible material having similar properties is illustrated at 10. The air hose is connected to a train line 11 running lengthwise of the rail vehicle 11a. A trolley 12 supports the train line by means of shackles 13. The trolley 12 has a hooked end portion 14 which suspends it from a hanger on the face 15 of the coupler pocket. The opposite end of air hose 10 is fitted with a glad hand connector 16 interfittable with a similarly shaped fitting at the end of the air hose on the next rail vehicle in the train.

In order to maintain the end of the air hose a suitable distance above the track structure, a suspension strap 18 is attached to a fitting 19 on the top surface of the glad hand having an aperture 19a and an apertured fitting 22 conventionally provided on coupler 23. The strap 18 is preferably flexible and resilient and typically formed by molding of a polymeric material such as polyurethane. It is provided with apertures 24 spaced at regular intervals along its length. Attachment to the respective fitting 19 and 22 is by means of clips 20, 21 passed through selected apertures 24. The preferred form of clip 20 is disclosed in more detail in FIGS. 2-10. Clip 21 may be the same as clip 20 or of similar but simplified construction as explained below.

As illustrated in FIGS. 2-10, clips 20 of the invention are formed of resiliently bendable wire. In the form of FIGS. 2 and 3, the clip comprises a pair of elongated clip arms 26 and 28 joined together by a looping return portion 30 at one end. Return portion 30 preferably extends through an angle greater than 180° and joins the arm at 38 where there is contact with clip arm 26 when the clip is in the closed position of FIGS. 2 and 3. At its opposite end, clip arm 26 terminates in portion 32 bent at 90° with respect to the arm. The end of portion 32 is then bent about 180° to form a hooked-shaped portion 34 which is adapted to fit over the end of clip arm 28 as illustrated in FIGS. 2 and 3. The end portion of arm 28 is preferably first bent laterally at an angle of about 90° with respect to the axis of arm 28 and then preferably bent back upon itself through 180° as illustrated at 36 so as to capture hook portion 34 and prevent its inadvertent uncoupling under the influence of tensile forces applied to arms either laterally or axially of the clip long axis.

In the open position, the loop formed by end portion 30 is substantially open when the free end of arm 28 is uncaptured from hook 34. In this position, the arm 26 or the arm 28 can readily be passed through the apertured opening of the glad hand fitting 19 and the glad hand fitting advanced lengthwise of either arm until it is within the loop 30. With the apertured glad hand fitting so positioned, the end 32 of clip arm 26 is then passed through a selected aperture in strap 18. The ends of the hook are then closed together so that the hook 34 captures the arm 28. In this position, the loop portion 30 including the portion shown at 38 in FIG. 2 which bears against the arm 26 capturing the glad hand fitting in place between the two arms.

The clip configuration just described eliminates the tendency of clips like those of the prior art to shift relative to the apertured fitting of the glad hand 16 along one or the other of the arms 26 or 28 when the coupler is in the buff condition when the coupler is not under load and is retracted within the coupler pocket. As indicated above, if the prior art clip shifts under slack coupler conditions, and the coupler is then placed under load, a lateral force applied between the apertured fitting and a clip arm will cause the arm to bend and ultimately to fail by exceeding the elastic limit of the wire, allowing the glad hand to drop down and possibly uncouple if it strikes track structure. In contrast, with clips made according to the invention, the apertured fitting is captured within the loop formed by end portion 30 unless and until the clip is deliberately opened. Clip failure caused by coupler movement between the slack and load conditions is avoided inasmuch as the forces acting on the clip are always exerted axially of the clip rather than laterally of it.

Clip 21 is provided for attachment of the upper end of strap 18 to the apertured fitting 22 of coupler 23 as shown in FIG. 1. The clip 21 may be similar to clip 20 having a pair of arms 26' and 28' joined by a return portion 30' bent through about 180°. As is the case with clip 20, clip arm 26' has a hook-shaped end portion 32' which fits through a selected aperture 24 on strap 18 and projects so as to hook over the end of arm 28'. As seen in FIG. 1, the arm 28' of clip 21 need not be provided with the retainer loop portion 30 of clip 20, as it has been determined that there is no condition of operation where clip 21 will shift to a position in which its arms will be subjected to transverse loading.

Figure 8:
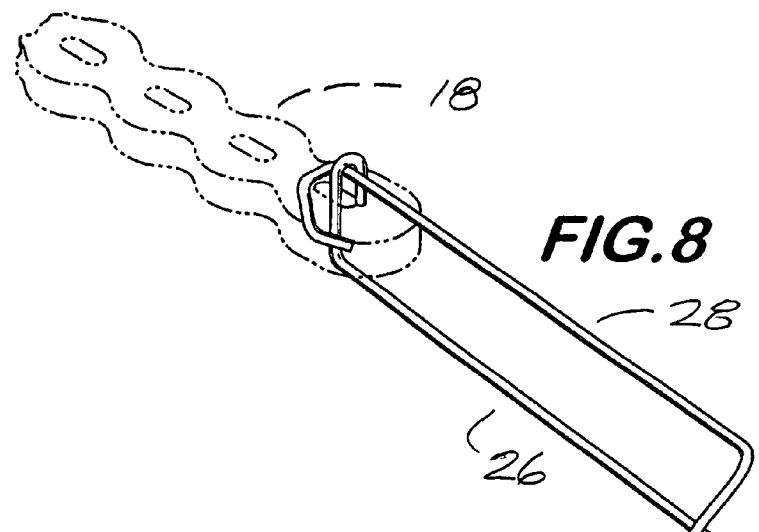
FIG. 8 is a perspective view showing an alternative version of the clip of the invention.
Figure 9:
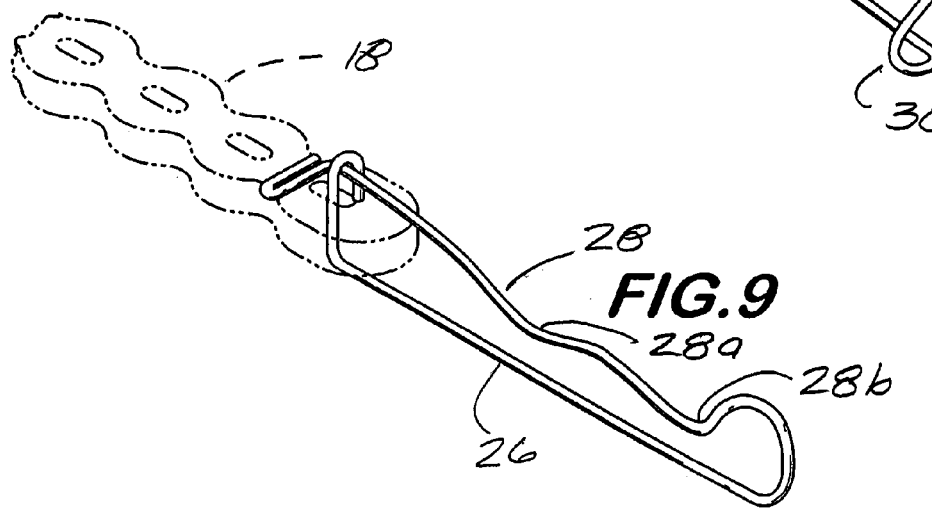
FIGS. 9 and 10 are perspective views of still other embodiments of the clip of the present invention.
Figure 10:
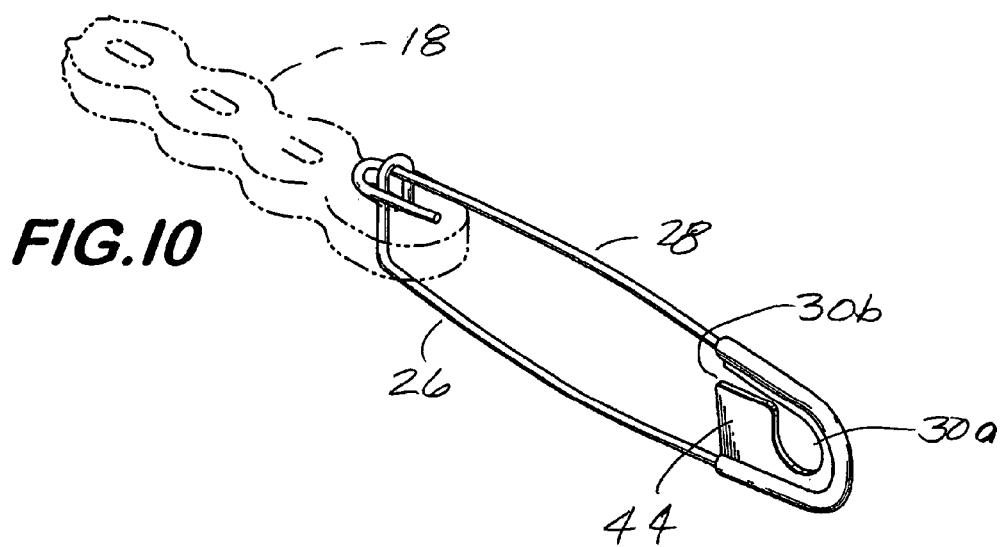

FIGS. 4-10 illustrate alternative versions of a clip assembly used as a part of a support strap assembly for connection of the support strap to the air hose glad hand according to the present invention. In these Figures and the description which follows, like numbers to those used in FIGS. 2 and 3 are used to identify the same or similar parts. In FIG. 4, clip arm 28 has a relatively straight section 28a which is biased to bear against arm 26 when the clip is closed. In FIG. 5 (similarly to FIG. 2), the contact between the two arms 26 and 28 is essentially a point contact. The return loop 30 captures the apertured fitting as in FIG. 2. FIG. 6 illustrates a form of clip in which the looped portion extends as a spiral between the arms 26 and 28. In FIG. 6, the loop 30 is comprised of two turns. In FIG. 7, the loop 30 is bent so that arm 28 crosses over arm 26 at two points 40 and 42. The cross-over configuration illustrated in this figure is provided to afford further certainty that the apertured fitting will remain within the loop 30. In FIG. 8, the loop 30 extends transversely of the plane of the arms 26 and 28 as a means of assuring that the apertured fitting will remain centered within the looped portion 30. In FIG. 9, the arm 28 includes two bends 28a and 28b extending substantially towards arm 26. FIG. 10 discloses an arrangement in which the loop 30 is provided with an insert 44 which is formed with a groove within which the apertured fitting fits. The insert provides a loop 30a of restricted size and a restricted throat 30b. The apertured fitting is preferably formed of a yieldable thermoplastic material which yields to permit passage of the apertured fitting into the inner loop 30a. The groove which receives the looped portion 30 is preferably flanged, the flange serving as a retainer for locking the insert to the clip.

In all embodiments described above, the clip, when open, can be conveniently threaded through the aperture of the glad hand fitting and the fitting centered within the return loop. The latching end of arm 26 is then passed through a selected aperture in strap 18, and the two ends of the arms of the clip are laterally together. The apertured fitting is thereupon maintained within the return loop and the problem of lateral loading on the clip arms is avoided.

What is claimed is:

1. A suspension system for maintaining an air brake hose of a vehicle at a predetermined height above a supporting road bed structure, the suspension system comprising a suspension strap having a first end portion and a second end portion, the first end portion being affixable to the vehicle, the suspension strap having an attachment portion located at the second end portion of the suspension strap, and a first releasable clip for connecting the suspension strap to an attachment fitting of the air brake hose, the first releasable clip having a first end and a latching end, a pair of flexibly resilient elongated arms extending away from the latching end of the first releasable clip to the first end of the clip, the arms being joined by a return portion at the first end of the first releasable clip, the pair of arms comprising a first arm and a second arm, the first arm at the latching end of the first releasable clip having a latching member for interlocking engagement with the second arm when desired, the latching member having an interlocking end portion for engaging the second arm, the latching end of the clip being operative when the latching member is latched to the second arm for engaging along the latching member a portion of the suspension strap used to suspend the air brake hose of the vehicle above the road bed structure and for maintaining the portion of the suspension strap between the first arm and the second arm, and a retainer located on the first releasable clip somewhere between the return portion at the first end of the first releasable clip and the latching member at the latching end of the first releasable clip, the retainer creating a confinement area between itself and the return portion of the first releasable clip when the latching member is latched to the second arm, the retainer being operative when the latching member is latched to the second arm for maintaining a portion of the attachment fitting of the air brake hose within the confinement area and out of position in which loading of the clip by the air brake hose is exerted laterally of the arms of the first releasable clip, the retainer comprising portions of the first and second arms resiliently touching one another between the return portion at the first end of the first releasable clip and the latching member at the latching end of the first releasable clip.

2. The suspension system of claim 1, wherein the vehicle is a railcar and the supporting road bed structure includes a rail structure supporting the railcar.

3. The suspension system of 1, wherein the suspension strap has a plurality of attachment apertures spaced lengthwise thereof, the first releasable clip being selectively insertable within one of said attachment apertures.

4. The suspension system of claim 1, the first releasable clip having a second end, the first arm of the first releasable clip and the second arm of the first releasable clip having end portions located approximately at the second end of the first releasable clip, the latching end of the first releasable clip being at the second end of the first releasable clip.

5. The suspension system of claim 4, the retainer being operative when the latching member is not latched to the second arm for permitting a portion of the attachment fitting of the air brake hose to be positioned between the retainer and the return.

6. A suspension system for maintaining an air brake hose of a vehicle at a predetermined height above a supporting road bed structure, the suspension system comprising a suspension strap having a first end portion and a second end portion, the first end portion being affixable to the vehicle, the suspension strap having an attachment portion located at the second end portion of the suspension strap, and a first releasable clip for connecting the suspension strap to an attachment fitting of the air brake hose, the first releasable clip having a first end and a latching end, a pair of flexibly resilient elongated arms extending away from the latching end of the first releasable clip to the first end of the clip, the arms being joined by a return portion at the first end of the first releasable clip, the pair of arms comprising a first arm and a second arm, the first arm at the latching end of the first releasable clip having a latching member for interlocking engagement with the second arm when desired, the latching member having an interlocking end portion for engaging the second arm, the latching end of the clip being operative when the latching member is latched to the second arm for engaging along the latching member a portion of the suspension strap used to suspend the air brake hose of the vehicle above the road bed structure and for maintaining the portion of the suspension strap between the first arm and the second arm, and a retainer located on the first releasable clip somewhere between the return portion at the first end of the first releasable clip and the latching member at the latching end of the first releasable clip, the retainer creating a confinement area between itself and the return portion of the first releasable clip when the latching member is latched to the second arm, the retainer being operative when the latching member is latched to the second arm for maintaining a portion of the attachment fitting of the air brake hose within the confinement area and out of position in which loading of the clip the air brake hose is exerted laterally of the arms of the first releasable clip, the retainer comprising parallel portions of the first and second arms resiliently touching one another when the latching member is latched to the second arm.

7. The suspension system of claim 6, wherein the vehicle is a railcar and the supporting road bed structure includes a rail structure supporting the railcar.

8. The suspension system of 6, wherein the suspension strap has a plurality of attachment apertures spaced lengthwise thereof, the first releasable clip being selectively insertable within one of said attachment apertures.

9. The suspension system of claim 6, the first releasable clip having a second end, the first arm of the first releasable clip and the second arm of the first releasable clip having end portions located approximately at the second end of the first releasable clip, the latching end of the first releasable clip being at the second end of the first releasable clip.

10. The suspension system of claim 9, the retainer being operative when the latching member is not latched to the second arm for permitting a portion of the attachment fitting of the air brake hose to be positioned between the retainer and the return.

11. A clip for interconnection with an attachment portion of a suspension strap used to suspend an air brake hose of a vehicle above a road bed structure, the clip having a first end and a latching end, a pair of flexibly resilient elongated arms extending away from the latching end of the clip to the first end of the clip, the arms being joined by a return portion at the first end of the clip, the pair of arms comprising a first arm and a second arm, the first arm at the latching end of the clip having a latching member for interlocking engagement with the second arm when desired, the latching member having an interlocking end portion for engaging the second arm, the latching end of the clip being operative when the latching member is latched to the second arm for engaging along the latching member a portion of the suspension strap used to suspend the air brake hose of the vehicle above the road bed structure and for maintaining the portion of the suspension strap between the first arm and the second arm, and a retainer located on the clip somewhere between the return portion at the first end of the clip and the latching member at the latching end of the clip, the retainer creating a confinement area between itself and the return portion of the clip when the latching member is latched to the second arm, the retainer being operative when the latching member is latched to the second arm for maintaining a portion of an attachment fitting of the air brake hose within the confinement area and out of position in which loading of the clip by the air brake hose is exerted laterally of the arms of the clip, the retainer comprising portions of the first and second arms resiliently touching one another between the return portion at the first end of the first releasable clip and the latching member at the latching end of the first releasable clip.

12. The clip of claim 11, the clip having a second end, the first arm of the clip and the second arm of the clip having end portions located approximately at the second end of the clip, the latching end of the clip being at the second end of the clip.

13. The clip of claim 12, the retainer being operative when the latching member is not latched to the second arm for permitting a portion of the attachment fitting of the air brake hose to be positioned between the retainer and the return.

14. A clip for interconnection with an attachment portion of a suspension strap used to suspend an air brake hose of a vehicle above a road bed structure, the clip having a first end and a latching end, a pair of flexibly resilient elongated arms extending away from the latching end of the clip to the first end of the clip, the arms being joined by a return portion at the first end of the clip, the pair of arms comprising a first arm and a second arm, the first arm at the latching end of the clip having a latching member for interlocking engagement with the second arm when desired, the latching member having an interlocking end portion for engaging the second arm, the latching end of the clip being operative when the latching member is latched to the second arm for engaging along the latching member a portion of the suspension strap used to suspend the air brake hose of the vehicle above the road bed structure and for maintaining the portion of the suspension strap between the first arm and the second arm, and a retainer located on the clip somewhere between the return portion at the first end of the clip and the latching member at the latching end of the clip, the retainer creating a confinement area between itself and the return portion of the clip when the latching member is latched to the second arm, the retainer being operative when the latching member is latched to the second arm for maintaining a portion of an attachment fitting of the air brake hose within the confinement area and out of position in which loading of the clip by the air brake hose is exerted laterally of the arms of the clip, the retainer comprising parallel portions of the first and second arms resiliently touching one another when the latching member is latched to the second arm.

15. The clip of claim 14, the clip having a second end, the first arm of the clip and the second arm of the clip having end portions located approximately at the second end of the clip, the latching end of the clip being at the second end of the clip.

16. The clip of claim 15, the retainer being operative when the latching member is not latched to the second arm for permitting a portion of the attachment fitting of the air brake hose to be positioned between the retainer and the return.

17. An assembly for maintaining an air brake hose of a vehicle at a predetermined height above a supporting road bed structure, the assembly comprising a suspension strap having a first end portion and a second end portion, the first end portion being affixed to the vehicle, the suspension strap having an attachment portion located at the second end portion of the suspension strap, an attachment fitting on the air brake hose, and a first releasable clip connecting the suspension strap to the attachment fitting of an air brake hose, the first releasable clip having a first end and a latching end, a pair of flexibly resilient elongated arms extending away from the latching end of the first releasable clip to the first end of the clip, the arms being joined by a return portion at the first end of the first releasable clip, the pair of arms comprising a first arm and a second arm, the first arm at the latching end of the first releasable clip having a latching member for interlocking engagement with the second arm when desired, the latching member having an interlocking end portion for engaging the second arm, the latching end of the clip being operative when the latching member is latched to the second arm for engaging along the latching member a portion of the suspension strap used to suspend the air brake hose of the vehicle above the road bed structure and for maintaining the portion of the suspension strap between the first arm and the second arm, and a retainer located on the first releasable clip somewhere between the return portion at the first end of the first releasable clip and the latching member at the latching end of the first releasable clip, the retainer creating a confinement area between itself and the return portion of the first releasable clip when the latching member is latched to the second arm, the retainer being operative when the latching member is latched to the second arm for maintaining a portion of the attachment fitting of the air brake hose within the confinement area and out of position in which loading of the clip by the air brake hose is exerted laterally of the arms of the first releasable clip, the retainer comprising portions of the first and second arms resiliently touching one another between the return portion at the first end of the first releasable clip and the latching member at the latching end of the first releasable clip.

18. The assembly of claim 17, wherein the suspension strap has a plurality of attachment apertures spaced lengthwise thereof, the clip being selectively inserted within one of said attachment apertures.

19. The assembly of claim 17,
the suspension strap having an attachment portion located at the first end portion of the suspension strap,
the assembly further including
an attachment fitting on the vehicle, and
the assembly further including
a second releasable clip connecting the first end portion of the suspension strap to the vehicle, the second releasable clip having
a first end and a latching end,
a pair of flexibly resilient elongated arms extending away from the latching end of the second releasable clip to the first end of the second releasable clip,
the arms of the second releasable clip being joined by a return portion at the first end of the second releasable clip,
the pair of arms of the second releasable clip comprising a first arm and a second arm,
the first arm of the second releasable clip at the latching end of the second releasable clip having a latching member for interlocking engagement with the second arm of the second releasable clip when desired,
the latching member of the first arm of the second releasable clip having an interlocking end portion for engaging the second arm of the second releasable clip,
the latching end of the second releasable clip being operative when the latching member of the second releasable clip is latched to the second arm of the second releasable clip for engaging a portion of the suspension strap along the latching member of the second releasable clip and for maintaining the portion of the suspension strap between the first arm of the second releasable clip and the second arm of the second releasable clip, and
a retainer located on the second releasable clip somewhere between the return portion of the first end of the second releasable clip and the latching member at the latching end of the second releasable clip, the retainer creating a confinement area between itself and the return portion of the second reliable clip when the latching member of the first arm of the second releasable clip is latched to the second arm of the second releasable clip,
the retainer of the second releasable clip being operative when the latching member of the first arm of the second releasable clip is latched to the second arm of the second releasable clip for maintaining a portion of the attachment fitting located on the vehicle within the confinement area created by the retainer of the second releasable clip and out of position in which loading of the second releasable clip by the air brake hose is exerted laterally of the arms of the second releasable clip.

20. The assembly of claim 17,
the first releasable clip having a second end,
the first arm of the first releasable clip and the second arm of the first releasable clip having end portions located approximately at the second end of the first releasable clip,
the latching end of the first releasable clip being at the second end of the first releasable clip.

21. The assembly of claim 20,
the retainer being operative when the latching member is not latched to the second arm for permitting a portion of the attachment fitting of the air brake hose to be positioned between the retainer and the return.

22. An assembly for maintaining an air brake hose of a vehicle at a predetermined height above a supporting road bed structure, the assembly comprising
a suspension strap having a first end portion and a second end portion, the first end portion being affixed to the vehicle,
the suspension strap having an attachment portion located at the second end portion of the suspension strap,
an attachment fitting on the air brake hose, and
a first releasable clip connecting the suspension strap to the attachment fitting of an air brake hose,
the first releasable clip having
a first end and a latching end,
a pair of flexibly resilient elongated arms extending away from the latching end of the first releasable clip to the first end of the clip,
the arms being joined by a return portion at the first end of the first releasable clip,
the pair of arms comprising a first arm and a second arm,
the first arm at the latching end of the first releasable clip having a latching member for interlocking engagement with the second arm when desired,
the latching member having an interlocking end portion for engaging the second arm,
the latching end of the clip being operative when the latching member is latched to the second arm for engaging along the latching member a portion of the suspension strap used to suspend the air brake hose of the vehicle above the road bed structure and for maintaining the portion of the suspension strap between the first arm and the second arm, and
a retainer located on the first releasable clip somewhere between the return portion at the first end of the first releasable clip and the latching member at the latching end of the first releasable clip, the retainer creating a confinement area between itself and the return portion of the first releasable clip when the latching member is latched to the second arm,
the retainer being operative when the latching member is latched to the second arm for maintaining a portion of the attachment fitting of the air brake hose within the confinement area and out of position in which loading of the clip by the air brake hose is exerted laterally of the arms of the first releasable clip,
the retainer comprising parallel portions of the first and second arms resiliently touching one another when the latching member is latched to the second arm.

23. The assembly of claim 22, wherein the suspension strap has a plurality of attachment apertures spaced lengthwise thereof, the clip being selectively inserted within one of said attachment apertures.

24. The assembly of claim 22,
the suspension strap having an attachment portion located at the first end portion of the suspension strap,
the assembly further including
an attachment fitting on the vehicle, and
the assembly further including
a second releasable clip connecting the first end portion of the suspension strap to the vehicle, the second releasable clip having
a first end and a latching end, a pair of flexibly resilient elongated arms extending away from the latching end of the second releasable clip to the first end of the second releasable clip, the arms of the second releasable clip being joined by a return portion at the first end of the second releasable clip, the pair of arms of the second releasable clip comprising a first arm and a second arm, the first arm of the second releasable clip at the latching end of the second releasable clip having a latching member for interlocking engagement with the second arm of the second releasable clip when desired, the latching member of the first arm of the second releasable clip having an interlocking end portion for engaging the second arm of the second releasable clip, the latching end of the second releasable clip being operative when the latching member of the second releasable clip is latched to the second arm of the second releasable clip for engaging a portion of the suspension strap along the latching member of the second releasable clip and for maintaining the portion of the suspension strap between the first arm of the second releasable clip and the second arm of the second releasable clip, and a retainer located on the second releasable clip somewhere between the return portion of the first end of the second releasable clip and the latching member at the latching end of the second releasable clip, the retainer creating a confinement area between itself and the return portion of the second reliable clip when the latching member of the first arm of the second releasable clip is latched to the second arm of the second releasable clip, the retainer of the second releasable clip being operative when the latching member of the first arm of the second releasable clip is latched to the second arm of the second releasable clip for maintaining a portion of the attachment fitting located on the vehicle within the confinement area created by the retainer of the second releasable clip and out of position in which loading of the second releasable clip by the air brake hose is exerted laterally of the arms of the second releasable clip.

25. The assembly of claim 22, the first releasable clip having a second end, the first arm of the first releasable clip and the second arm of the first releasable clip having end portions located approximately at the second end of the first releasable clip, the latching end of the first releasable clip being at the second end of the first releasable clip.

26. The assembly of claim 25, the retainer being operative when the latching member is not latched to the second arm for permitting a portion of the attachment fitting of the air brake hose to be positioned between the retainer and the return.

\* \* \* \* \*